United States Patent [19]
Eadie et al.

[11] 4,123,763
[45] Oct. 31, 1978

[54] PHOTODRAFTING EQUIPMENT

[75] Inventors: David W. Eadie, Corfe Mullen; Charles J. Hancock, Bournemouth, both of England

[73] Assignee: Quest Automation Limited, Dorset, England

[21] Appl. No.: 836,825

[22] Filed: Sep. 26, 1977

[30] Foreign Application Priority Data

Sep. 29, 1976 [GB] United Kingdom ............... 40196/76

[51] Int. Cl.² ............................................ G03B 41/00
[52] U.S. Cl. ...................................................... 354/4
[58] Field of Search ...................... 355/53, 77, 67, 70, 355/71; 354/4

[56] References Cited
U.S. PATENT DOCUMENTS

| 2,063,312 | 12/1936 | Hopkins | 355/67 X |
| 3,610,119 | 10/1971 | Gerber et al. | 354/4 |
| 3,648,578 | 3/1972 | Ritchie | 354/4 |
| 3,673,937 | 7/1972 | Mader | 354/4 |
| 3,722,996 | 3/1973 | Fox | 355/53 |
| 3,903,527 | 9/1975 | Frehling | 354/4 |
| 3,904,291 | 9/1975 | Webster | 354/4 X |

Primary Examiner—Donald A. Griffin
Attorney, Agent, or Firm—Pollock, Vande Sande and Priddy

[57] ABSTRACT

Photodrafting equipment which can be operated alternatively in first and second modes. In the first mode, the equipment can expose continuous lines in conventional manner. In the second mode, the equipment can expose a plurality of discrete areas or "pads" without interruption of carriage movement. To this end the projection apparatus of the equipment comprises a relatively low intensity light source for exposing the lines, a relatively high intensity flash light source for exposing the pads, and a rotatable reflecting prism to select one or the other of the light sources in accordance with the mode of operation.

8 Claims, 5 Drawing Figures

PHOTODRAFTING EQUIPMENT

BACKGROUND OF THE INVENTION

This invention relates generally to photodrafting equipment, that is to say, equipment arranged to project a beam of light to illuminate a spot on a photosensitive surface and to move the spot of light relatively to the surface to expose a line thereon. More particularly, the invention relates to projection apparatus for photodrafting equipment.

Photodrafting equipment is commonly used to expose photographic sheets used in turn to produce masks for the production of printed circuit boards and the like. Projection apparatus mounted on a carriage movable in X- and Y-co-ordinate directions under the control of a computer or other control means is arranged to project a beam of light substantially orthogonally against a photographic sheet disposed in a plane parallel with the X- and Y-co-ordinate directions. By this means, a line can be exposed on the sheet by movement of the carriage during continuous projection of the beam, or discrete "pads" can be exposed in selected positions on the sheet by moving the carriage to the corresponding co-ordinate positions successively, the light beam being projected only when the carriage is located at one of those positions.

A problem which arises when using the equipment for the exposure of discrete pads, especially if large numbers of such pads are included in the pattern to which the sheet is to be exposed, relates to the time taken in moving the carriage from one exposure position to the next. The times required to accelerate the carriage to maximum speed from standstill at one exposure position and then to decelerate the carriage to standstill again at the next exposure position can form a substantial proportion of the total time taken for the exposure of a complete pattern. Accordingly, reduction or elimination of the acceleration and deceleration times could provide a substantial increase in the production capacity of the equipment.

SUMMARY OF THE INVENTION

It is an object of the present invention to provide photodrafting equipment which can be operated in conventional manner to expose continuous lines and can also be operated to expose a plurality of discrete areas without interruption of carriage movement.

The invention provides projection apparatus for photodrafting equipment, the apparatus comprising first and second light sources, the first light source being operable continuously at relatively low intensity and the second light source being a flash source of relatively high intensity, and light source selection means operable to enable either one of said light sources to be selected in use to provide a source for the beam of light projected by the apparatus.

DESCRIPTION OF THE ILLUSTRATED EMBODIMENTS

In order that the invention may be clearly understood and readily carried into effect, an embodiment thereof will now be described by way of example only with reference to the accompanying drawings wherein.

Figure 1:
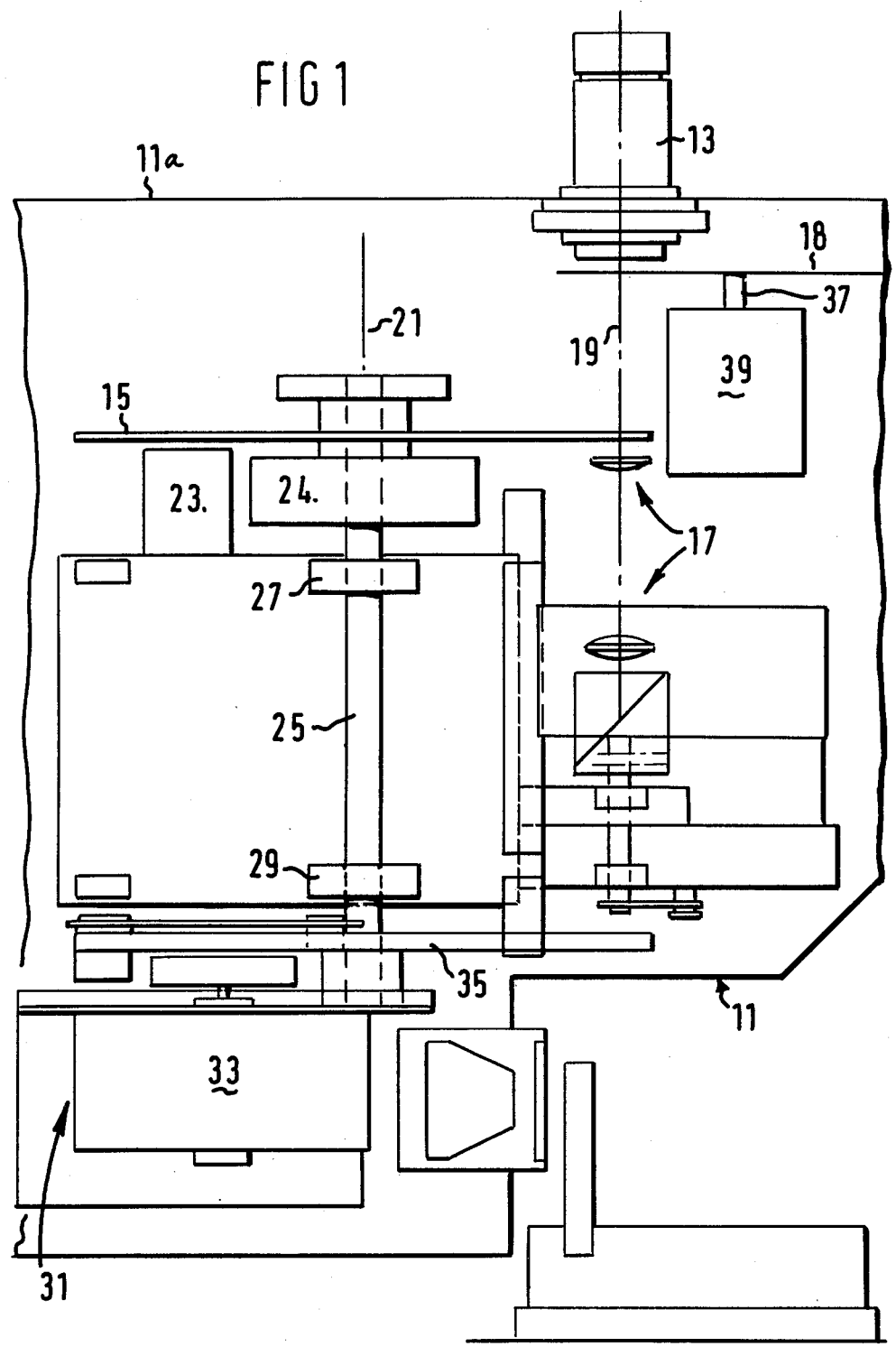
FIG. 1 is a front elevation of projection apparatus in accordance with the invention showing the general layout of the apparatus.

FIG. 1 shows in front elevation the housing 11a of the carriage 11 in photodrafting equipment, the carriage 11 being movable (by means not shown) in horizontal X- and Y-co-ordinate directions under the control of a computer. Projection apparatus mounted in the carriage is arranged to project a beam of light vertically upwardly from a projection lens 13, as described in more detail hereinafter, for impingement on a sheet of photosensitive material 61 (FIG. 4) disposed in a horizontal plane above the carriage.

The projection lens 13 is arranged to focus on the surface of the photosensitive material a real image of an image aperture formed near the periphery of an image disc 15. The image disc is illuminated from below by a light source (not shown in FIG. 1) and condenser system 17. An exposure control disc 18 is interposed in the optical path 19 between the image disc 15 and projection lens 13.

The image disc 15 is formed with a series of differently shaped or sized image apertures disposed around its periphery, the disc being rotatable about its axis 21 to enable any selected one of the apertures to be moved into position for illumination by the condenser system 17 and thus projection of its image onto the photosensitive surface. Optical sensing means 23 is mounted beneath the image disc 15 radially inwardly of the peripheral series of image apertures. Means 23 responds in use to coded markings provided on the underside of the disc whereby the angular position of the disc may be sensed to identify the image aperture currently positioned in the optical path 19 for projection of its image onto the photosensitive surface.

The image disc 15 is detachably mounted on a hub 24 fast with a drive shaft 25 journalled for rotation about the axis 21 in bearings 27 and 29. The drive shaft 25 is itself driven by means of an indexing mechanism 31 including a synchronous motor 33 arranged to drive an indexing disc 35 attached to the shaft 25. In operation, the indexing mechanism 31 responds to a drive pulse supplied to synchronous motor 33 to rotate the drive shaft 25 through an angle equal to the angular spacing between adjacent ones of the image apertures in image disc 15, the mechanism including a latching device arranged to ensure precision in the stepping angle of the indexing disc. Various forms of indexing mechanism suitable for this purpose will be well known to those skilled in the art.

The exposure control disc 18 is mounted for rotation with the drive shaft 37 of a stepping motor 39 to vary the intensity of the projected light beam when the photodrafting equipment is being operated to expose a line. The disc 18 may, for example, comprise an aperture-stop mask formed with a tapered slot which, on rotation of the disc, is moved lengthwise through the optical path to vary the size of the exit pupil of the apparatus. Alternatively, the disc 18 may comprise a graded absorption filter, the absorption of the filter varying in the direction of angular displacement about the axis of rotation of the disc. Such intensity control discs are described in greater detail in our copending U.S. application Ser. No. 836,827 filed Sept. 26, 1977, for Optical Projection Apparatus.

During movement of the carriage at normal speed when exposing a line, the light beam is required to be at maximum intensity. As deceleration of the carriage is commenced towards the finish of the line, the computer or other means directing operation of the equipment causes drive pulses to be supplied to the stepping motor 39 to rotate the disc 18. Such rotation of the disc progressively decreases the intensity of the projected light beam in accordance with the reduction in speed of the carriage, thereby providing substantially constant exposure of the line as the carriage is brought to a halt.

Similarly, when commencing the exposure of a fresh line, the intensity of the light beam is progressively varied with the speed of the carriage to provide substantially constant exposure of the line during acceleration of the carriage.

Figure 3:
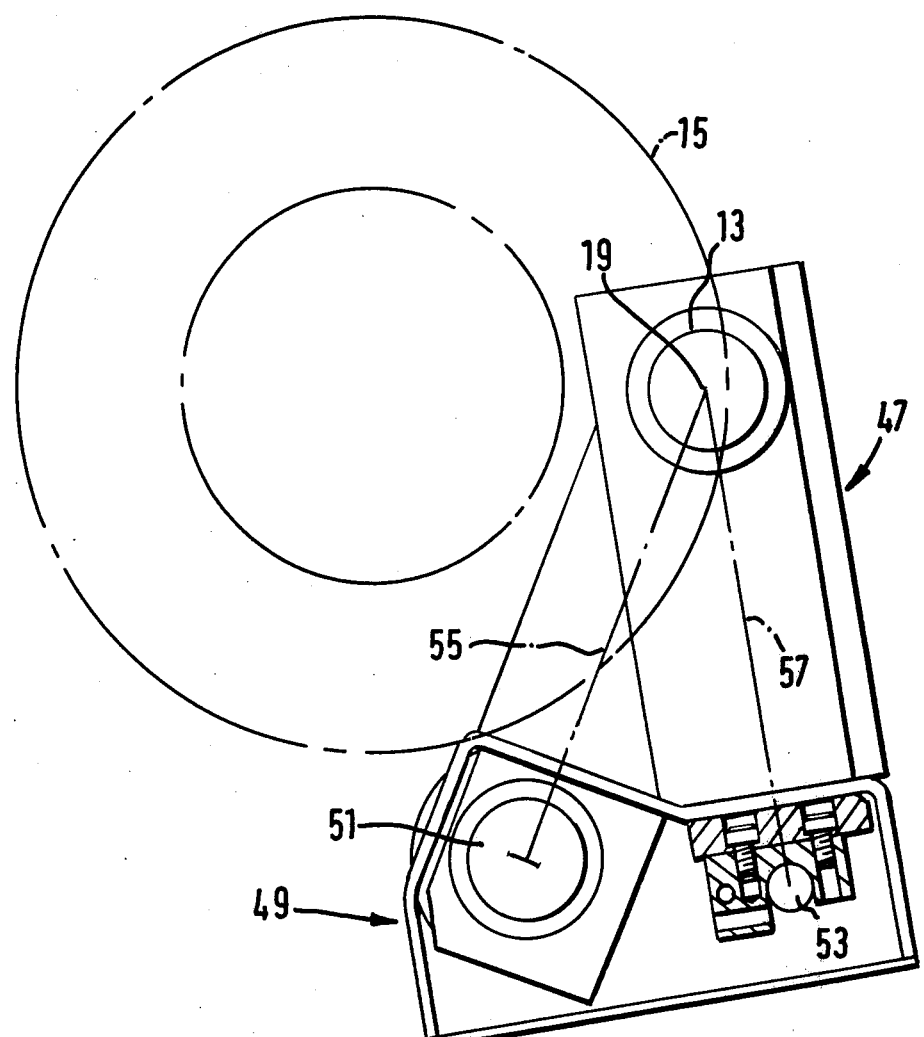
FIG. 3 is a plan view showing generally the disposition of the optical unit in the apparatus of FIG. 1.
Figure 2:
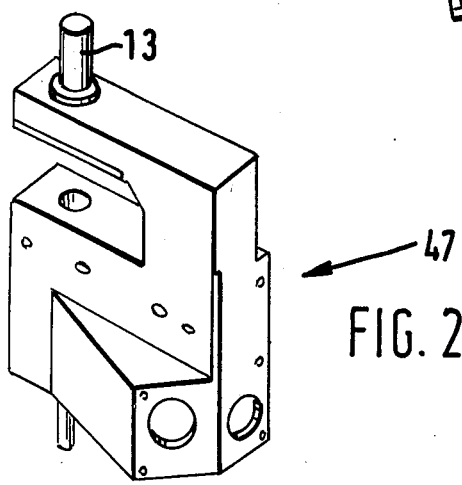
FIG. 2 is a perspective view of the optical unit of the apparatus of FIG. 1.

The optical system of the apparatus of FIG. 1 is of unitary construction, and a perspective view of the unit, with the lamp assembly omitted, is shown at 47 in FIG. 2. FIG. 3 is a plan view of the optical unit 47 complete with the lamp assembly 49, indicating the relative dispositions of the optical unit and object disc 15. It is noted that the direction of the front view of FIG. 1 is in the upward direction as seen in FIG. 3.

The lamp assembly 49 of the optical unit 47 includes two light sources: a tungsten filament lamp 51 operable continuously, and a flash lamp 53 capable of providing short duration flashes of high intensity. Each lamp 51 and 53 is provided with a local lens and/or mirror system (not shown in FIG. 3) arranged to direct light from the lamp along a respective one of intersecting horizontal optical paths 55 and 57. The axes of the optical paths 55 and 57 intersect on the axis of vertical optical path 19. A reflecting prism is disposed at the intersection of the optical paths 19, 55 and 57, the plane of the reflecting surface of the prism being inclined to the horizontal at an angle of substantially 45°. The prism is mounted for rotation about the axis of vertical optical path 19, whereby light from either selected one of the lamps 51 and 53 may be directed along the optical path 19.

Figure 4:
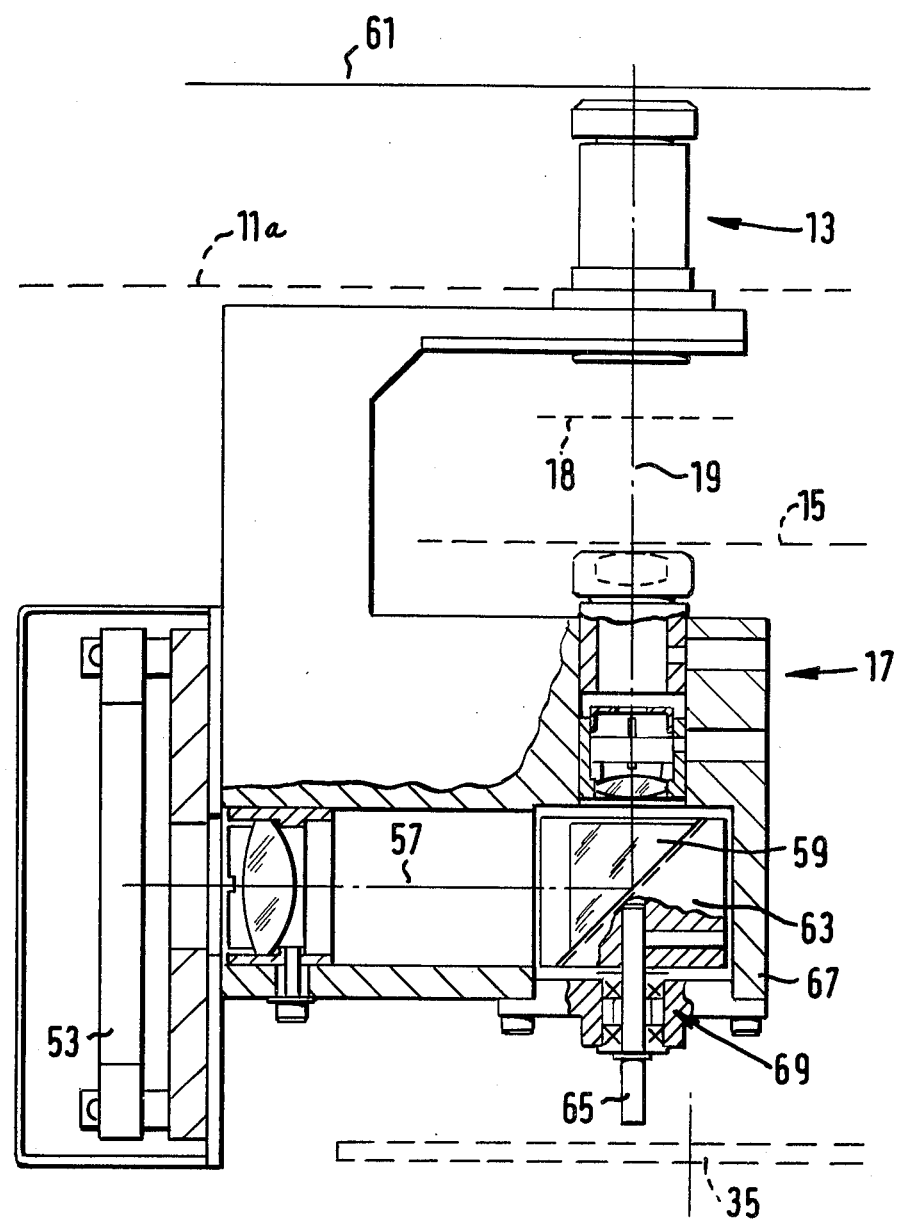
FIG. 4 is a side elevation of the apparatus of FIG. 1 showing, in particular, details of the optical unit.

FIG. 4 is a part-sectional side elevation of the optical unit showing the above-mentioned reflecting prism at 59, together with the flash lamp 53, condenser system 17 and projection lens 13. FIG. 4 also shows at 61 the above-mentioned plane in which the sheet of photosensitive material is disposed in use of the equipment, the plane of the object disc 15, and the level of the exposure control disc 18.

The reflecting prism 59 is mounted in a holder 63 fast with a shaft 65 journaled in the housing 67 of the unit at 69 for rotation about a vertical axis which is colinear with the axis of the optical path 19. The shaft 65 is coupled to an actuator (not shown) operable to rotate the prism between, on the one hand, the position shown in FIG. 4 in which it is oriented to direct light from the flash lamp 53 into the condenser system 17, and, on the other hand, the position in which it is orientated to so direct light from the tungsten filament lamp 51 (FIG. 3).

In operation of the equipment to expose a line on the sheet of photosensitive material, the actuator for the prism 63 is operated to rotate the prism into that position required to select light from the tungsten filament lamp 55. The lamp 55 is energized continuously thereby to expose the line by movement of the carriage in the manner described previously.

In operation of the equipment to expose discrete pads on the sheet of photosensitive material 61, the actuator for the prism 63 is operated to rotate the prism into that position required to select light from the flash lamp 53. The X-Y carriage of the equipment is moved continuously through successive exposure positions corresponding to the required positions of the pads, the flash lamp 53 being energized to produce a short duration flash of high intensity as the carriage is moved through each such exposure position. The flash is arranged to be of sufficiently short duration to avoid blurring of the photographic images of the pads formed on the photosensitive surface even if those pads are exposed when the carriage is moving at maximum speed. Needless to say, the intensity of the flashes should be high to ensure adequate exposure of the pads despite the short duration of each flash.

Figure 5:
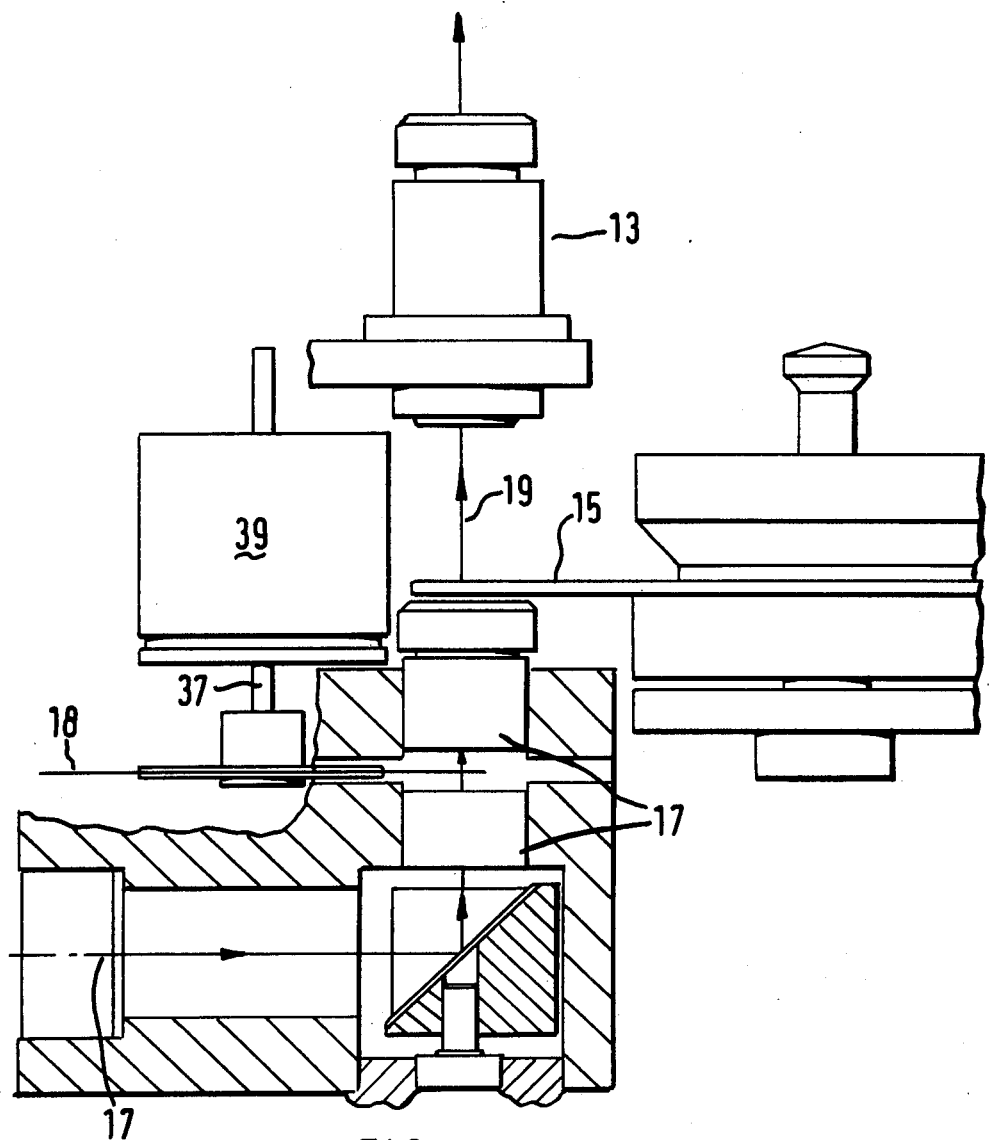
FIG. 5 is a front elevation of a modified form of projection apparatus in accordance with the invention showing the general layout of the apparatus.

FIG. 5 illustrates projection apparatus in accordance with the invention which is similar to that of FIG. 1, corresponding components of the two embodiments being indicated with the same reference numerals. In the apparatus of FIG. 5, the exposure control disc 18, is interposed in the optical path 19 between adjacent sections of the condenser system 17.

It will be appreciated that the equipment described can be used for exposing either lines or discrete pads on the sheet of photosensitive material, and that when exposing discrete pads the equipment can be operated at high speed without it being necessary to bring the carriage to a halt at each exposure position.

We claim:

1. In photodrafting equipment, projection apparatus comprising:
    (a) first and second light sources, the first light source comprising an incandescent lamp and being operable continuously at relatively low intensity, and the second light source comprising a gas discharge lamp and being a flash source of relatively high intensity; and
    (b) light source selection means operable to enable either one of said light sources to be selected in use to provide a source for the beam of light projected by the apparatus.

2. In photodrafting equipment, projection apparatus comprising:
    (a) first and second light sources, the first light source being operable continuously at relatively low intensity and the second light source being a flash source of relatively high intensity;
    (b) a projection lens system with an output optical path associated therewith; and
    (c) light source selection means operable to enable either one of said light sources to be selected in use to provide a source for the beam of light projected by the apparatus, said light source selection means comprising a reflecting member movable between first and second positions in which the member reflects beams of light along said output optical path from, respectively, said first and second light sources.

3. Apparatus as claimed in claim 2 wherein said reflecting member is formed by a reflecting prism.

4. Apparatus as claimed in claim 2 wherein said reflecting member is rotatable between said first and second positions.

5. Apparatus as claimed in claim 4 comprising a first lens system associated with said first light source to direct light therefrom along a first optical path and a second lens system associated with said second light source to direct light therefrom along a second optical path, wherein said first and second optical paths intersect on said output optical path and said reflecting member is located at the intersection and rotatable about the axis of said output optical path.

6. In photodrafting equipment, a movable carriage, projection apparatus mounted on said carriage, said projection apparatus comprising first and second light sources, the first light source being operable continuously at relatively low intensity and the second light source being a flash source of relatively high intensity, light source selection means operable to enable either one of said light sources to be selected in use to provide a source for the beam of light projected by the apparatus, and mode selection means enabling operation of said equipment in first and second modes alternatively, said light source selection means being responsive to said mode selection means to select said first and second light sources in said first and second modes respectively whereby said apparatus can be operated in said first mode to expose continuous lines and can be operated in said second mode to expose a plurality of discrete pads without interrupting movement of said carriage.

7. In photodrafting equipment, projection apparatus comprising:
(a) a first light source having a relatively low light intensity output, a relatively slow build-up to its full intensity and relatively long decay time.
(b) a second light source having a relatively high intensity output, a rapid rise time to full intensity and short decay time;
(c) light source selection means operable to enable either one of said light sources to be selected to provide a source for the beam of light to be projected;
(d) means for energizing said first light source continuously; and
(e) means for operating said second light source to produce high intensity exposures of short duration.

8. Method of operating photodrafting equipment having a first light source of relatively low intensity and slow response times and a second light source of relatively high intensity and rapid response times, an optical system for directing a light beam from either one of said light sources through a mask to a photosensitive material, selection means for selecting which of said light sources is to be used, and a carriage for moving said optical system relative to said photosensitive material, said method comprising selecting said low intensity light source for operation at certain times, traversing said carriage to trace a path for the light beam from said low intensity source over said photosensitive material while said low intensity light source is continuously illuminated to set up line images on said photosensitive material, and at other times selecting said high intensity light source for operation, and while traversing said carriage illuminating said high intensity light source for brief selected time periods to set up discrete pad images at selected locations on said photosensitive material, whereby a desired pattern of lines and pad images is generated on said photosensitive material.

* * * * *